United States Patent [19]

Frumholtz et al.

[11] Patent Number: 4,986,061

[45] Date of Patent: Jan. 22, 1991

[54] MOWER WITH SKIDS

[75] Inventors: Johnny Frumholtz, Saverne; Roland Helfer, Lampertheim, both of France

[73] Assignee: Kuhn, s.a., Saverne, France

[21] Appl. No.: 406,577

[22] Filed: Sep. 13, 1989

[30] Foreign Application Priority Data

Sep. 13, 1988 [FR] France .................... 88 12071

[51] Int. Cl.⁵ .......................................... A01D 34/63
[52] U.S. Cl. ........................................ 56/6; 56/320.1; 56/DIG. 24
[58] Field of Search .................. 56/13.6, 13.7, 6, 295, 56/320.1, DIG. 16, DIG. 20, DIG. 24

[56] References Cited

U.S. PATENT DOCUMENTS

| | | | |
|---|---|---|---|
| 4,693,062 | 9/1987 | van der Lely et al. | 56/13.6 |
| 4,709,540 | 12/1987 | Collart | 56/6 |
| 4,815,262 | 3/1989 | Koch et al. | 56/13.6 |
| 4,827,703 | 5/1989 | van der Lely | 56/13.6 |

FOREIGN PATENT DOCUMENTS

| | | |
|---|---|---|
| 099314 | 1/1984 | European Pat. Off. . |
| 110812 | 6/1984 | European Pat. Off. . |
| 223302 | 5/1987 | European Pat. Off. . |
| 260750 | 3/1988 | European Pat. Off. . |
| 2377755 | 8/1978 | France . |
| 2394239 | 1/1979 | France . |
| 2089636 | 6/1982 | United Kingdom . |
| 2166032 | 4/1986 | United Kingdom . |

Primary Examiner—Ramon S. Britts
Assistant Examiner—Terry Lee Melius
Attorney, Agent, or Firm—Oblon, Spivak, McClelland, Maier & Neustadt

[57] ABSTRACT

A mower according to the invention includes a mowing group provided with a cutting bar and skids. The rear connection of each one of the skids includes connection means that allow the rear part of the skid to separate from the cutting bar in a relative movement directed backwardly, considering the direction of advance.

18 Claims, 3 Drawing Sheets

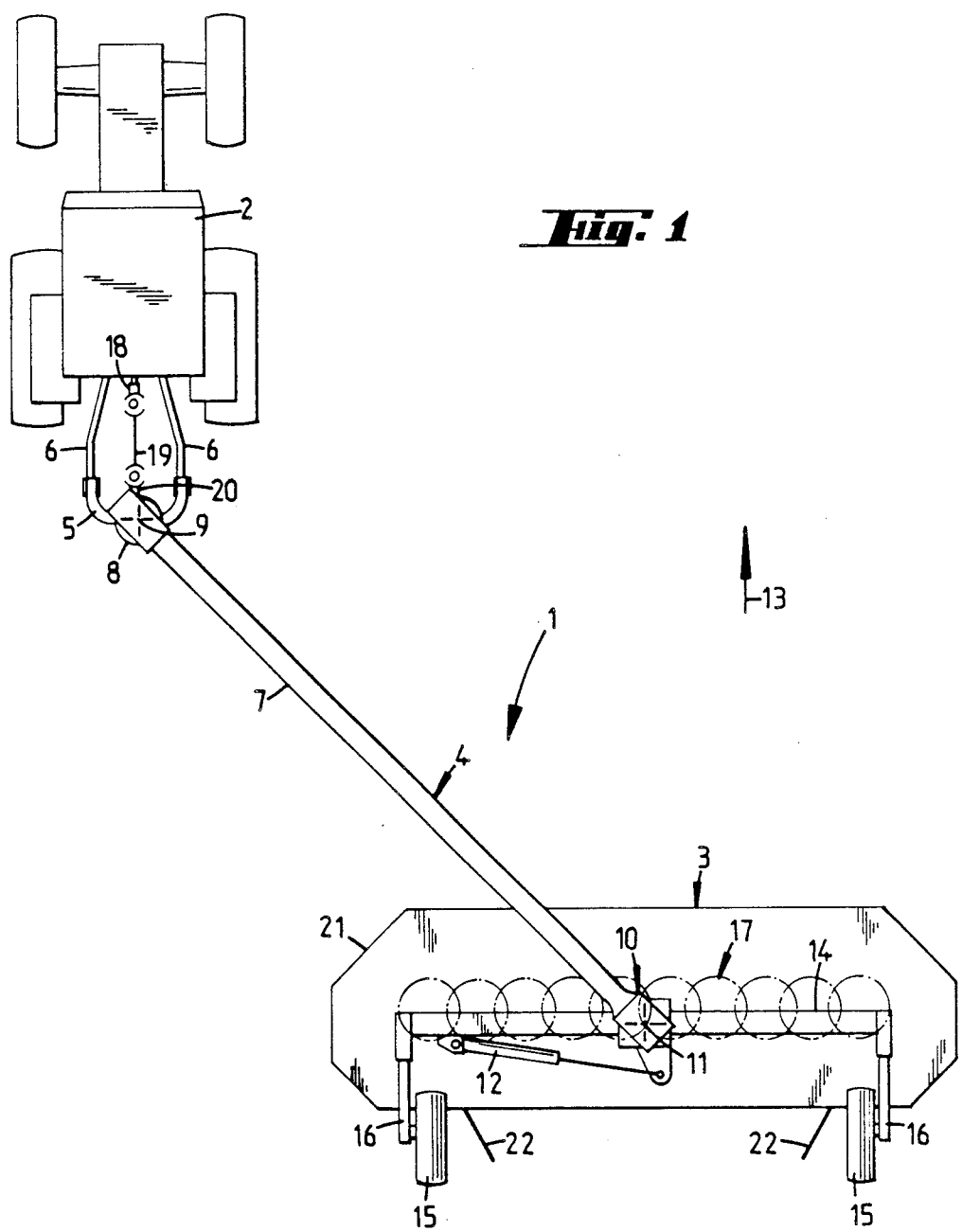

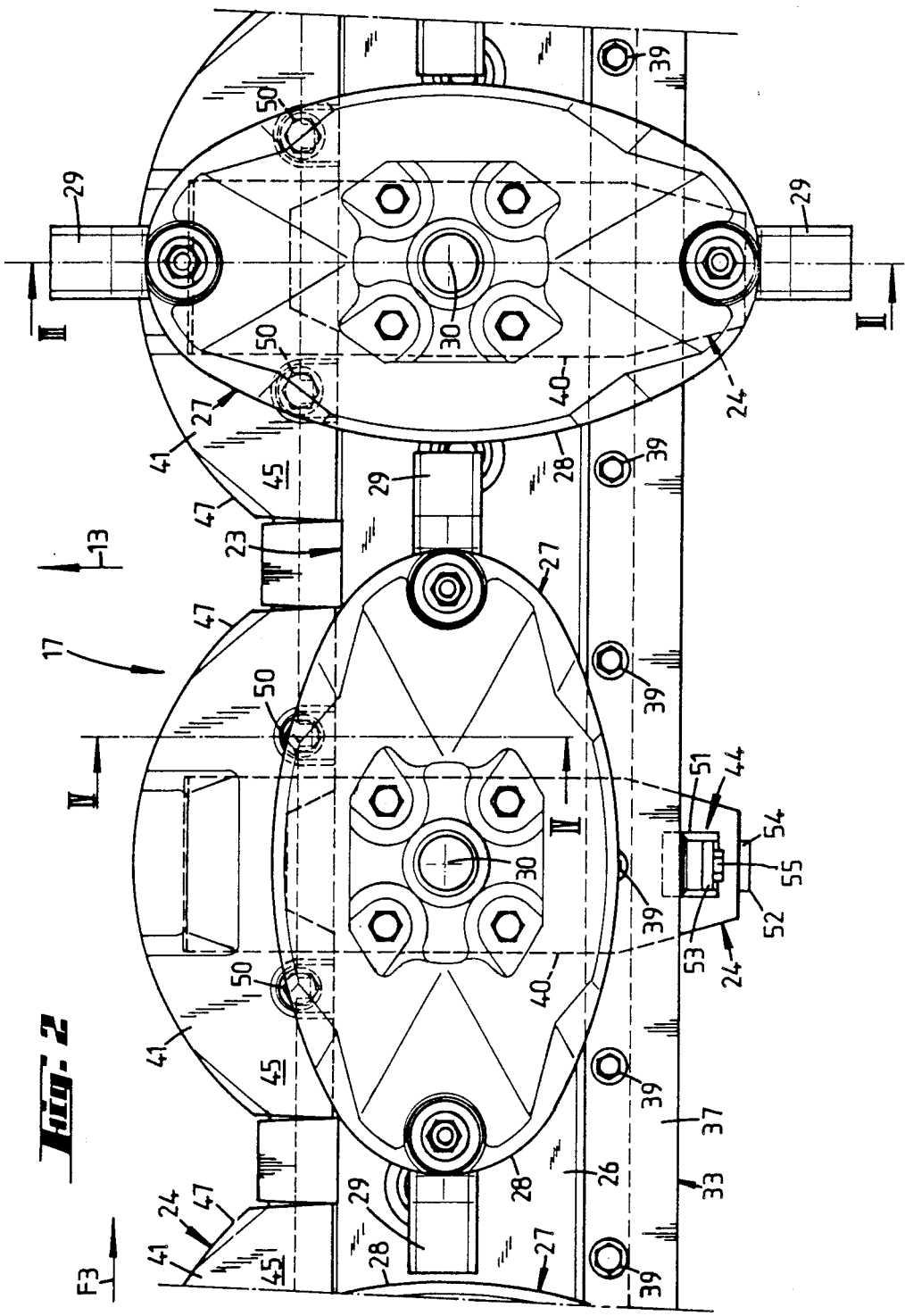

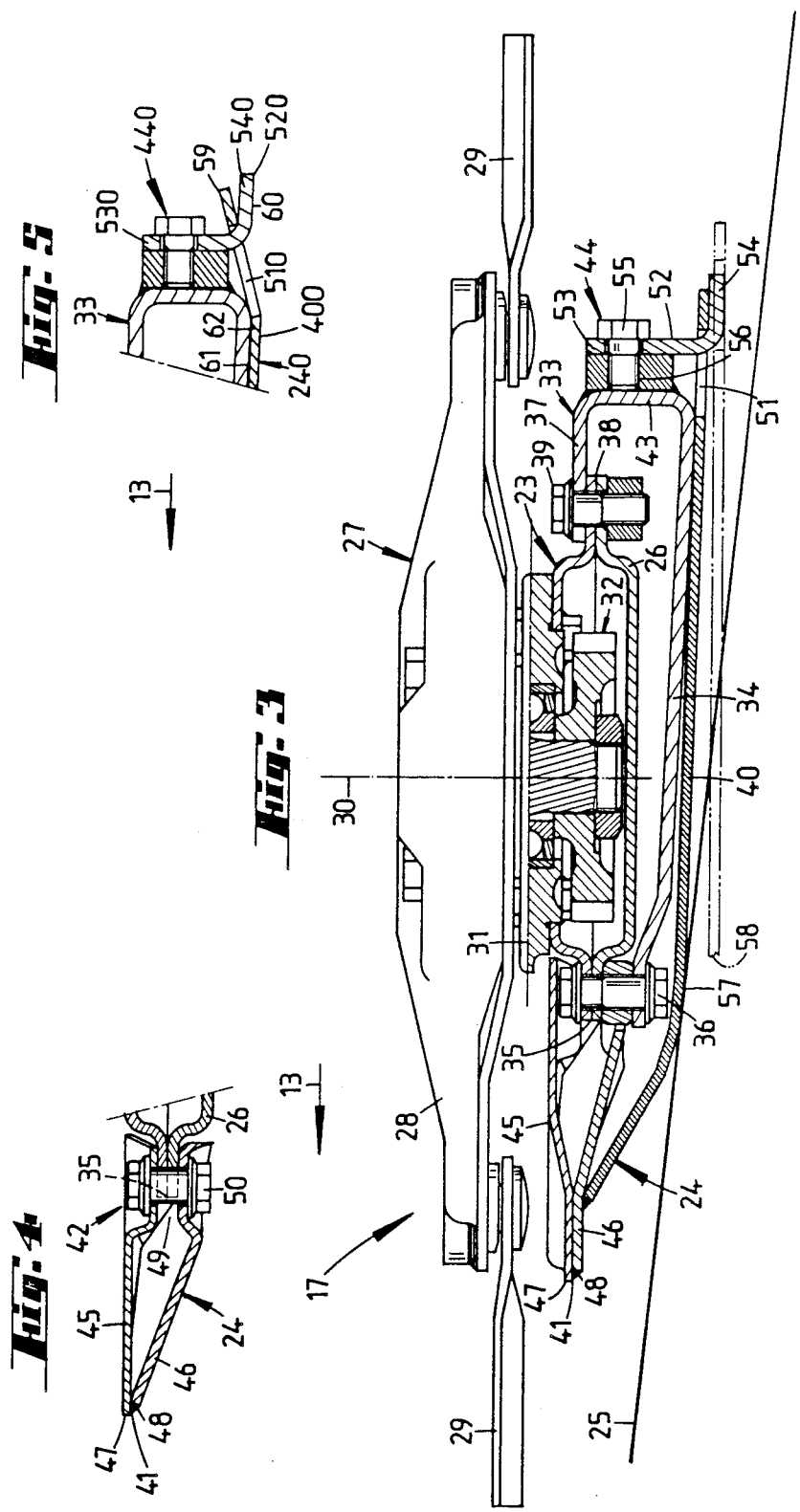

MOWER WITH SKIDS

FIELD OF THE INVENTION

This invention relates to a mower comprising a mowing group provided with a cutting bar that comprises a carrying beam and rotary cutting elements extending above the carrying beam and each rotating around a geometric axis directed upwardly. One part at least of each rotary cutting element is guided in rotation in the carrying beam. The mowing group is further provided with skids by which the cutting bar slides over the ground during work, and each of the skids is connected to the cutting bar by a front connection and a rear connection.

BACKGROUND OF THE INVENTION

In mowers of this type now known, a skid is provided at least approximately at the level of each cutting element. Often this skid is provided at its front part with a member for protecting the corresponding cutting element. That member also connects the skid to the front part of the carrying beam. At its rear part, the skid is rigidly connected either to the carrying beam or to a stiffening device extending behind the carrying beam and sized, shaped, and positioned to stiffen the carrying beam.

Although these skids are made of wear-resistant steel, it is inevitable that they wear during work at the most stressed spot. Then it can happen in practice that this wear reaches such a degree that the skid breaks at the most stressed spot when the thickness of the remaining material becomes insufficient. As the mower continues to advance, the rear part of the broken skid hooks into the ground at the break and is then entirely bent backwards. This causes tearing away of the rear connection and/or the deformation of the carrying beam or of the stiffening device at the spot where the rear part of the broken skid is or was connected.

It will be understood that such an incident could cause relatively high repair costs.

OBJECT OF THE INVENTION

The object of this invention is to solve the foregoing problem.

SUMMARY OF THE INVENTION

For this purpose, a mower according to this invention is characterized in that the rear connection of each skid comprises connecting means that allow the rear part of the skid to separate from the cutting bar in a relative movement directed backwardly, considering the direction of advance of the mower during work.

Thanks to this characteristic, the above-mentioned problem is eliminated. If a skid of the mower according to this invention is broken and its rear part is hooked into the ground, said rear part can become detached from the cutting bar when the mower continues to advance. Thus, no tearing off of the rear connection or deformation of the cutting bar at the spot of the rear connection occurs.

According to a particularly advantageous embodiment, the connecting means of the rear connection of a skid comprise a connecting element that is rigidly connected to the cutting bar and that is connected to the skid by hooking in an opening of the skid.

BRIEF DESCRIPTION OF THE DRAWINGS

FIG. 1 shows, in top view, a mower according to the invention, hitched to a farm tractor.

FIG. 2 shows on an enlarged scale a partial top view of the mowing group of the mower of FIG. 1.

FIG. 3 shows a view along the arrow F3 in FIG. 2 of the mowing group partially cut along plane III—III in FIG. 2.

FIG. 4 shows a partial view along the arrow F3 in FIG. 2 of the carrying beam and of a skid cut along the plane IV—IV in FIG. 2.

FIG. 5 shows a second embodiment of the rear connection of a skid to the cutting bar.

DETAILED DESCRIPTION OF THE PRESENTLY PREFERRED EMBODIMENTS

FIG. 1 shows a mower 1 according to the invention coupled to a farm tractor 2. The mower 1 is made up of a body 3 and a drawbar 4. The drawbar 4 is made up of a first drawbar 5 sized, shaped, and positioned to be connected to lower hitching arms 6 of the farm tractor 2 and a second drawbar 7 connected to the body 3 of the mower 1. The first drawbar 5 is connected to the front part of the second drawbar 7 by a connecting device 8 that is known to those skilled in the art and that allows a pivoting of the first drawbar 5 relative to the second drawbar 7 around an axis 9 directed upwardly. At its rear part, the second drawbar 7 is connected to the body 3 by a joint 10 having an axis 11 directed upwardly and extending at least approximately to the middle of the body 3. The position of the drawbar 4 relative to the body 3 can be adjusted by making the drawbar 4 pivot around the axis 11 of the joint 10. Adjustment of the desired position and maintenance in the desired position are achieved by a control and locking element 12 (a hydraulic cylinder in the example illustrated). Thanks to this arrangement, the body 3 of the mower 1 can extend—seen from the rear in the working direction 13—either to the right or to the left of the farm tractor 2. This allows mowing both going and coming.

The body 3 of the mower 1 comprises a frame 14 that rests on the ground by two wheels 15 extending to the rear of the frame 14. The wheels 15 are each connected in an articulated manner to the frame 14 by a wheel arm 16 so as to be able to be moved relative to the frame 14. This movement is accomplished by the action of a control means (not shown), such as a hydraulic cylinder for example, which moves the frame 14 away from the ground in the transport phase and which moves the frame 14 close to the ground during the working phase.

Further, the body 3 of the mower 1 comprises a mowing group 17 supported by the frame 14. Driving of the mowing group 17 is performed from a power takeoff 18 of the farm tractor 12 that drives, by a telescopic shaft 19 with universal joints, an input shaft 20 of the connecting device 8 that is also, in a manner known to those skilled in the art, a movement transmission device.

Transmission of the movement from the input shaft 20 to the mowing group 17 is not represented, since it is within the scope of one skilled in the art.

It is also seen in FIG. 1 that the body 3 of the mower 1 is provided with a protecting device 21 and elements for processing the product cut by the mowing group 17, such as windrowing elements 22 for example.

Mowing group 17 appears in more detail in FIGS. 2 to 4. That mowing group 17 is provided with a cutting bar 23 and a plurality of skids 24 by which the cutting bar 23 slides over the ground 25 (FIG. 3) during work.

The cutting bar 23 comprises a carrying beam 26 and a plurality of rotary cutting elements 27. Each rotary cutting element 27 is formed by a cutting tool support 28 and a plurality of cutting tools 29. The rotary cutting elements 27 extend above the carrying beam 26, and each rotary cutting element 27 rotates around a geometric axis 30 directed upwardly. For this purpose, each rotary cutting element 27 is guided in rotation in a bearing 31 connected to the carrying beam 26. The carrying beam 26 is made in the shape of a housing containing drive elements 32. In the example illustrated, the drive elements 32 consist of a cascade of cylindrical gears meshing with one another.

To limit the bending of the carrying beam 26, the cutting bar 23 also comprises a stiffening element 33. In the example illustrated, the stiffening element 33 is made up of a piece of bent sheet metal that exhibits, seen along the arrow F3 (FIG. 2), a U shape and that has a length at least approximately equal to that of the carrying beam 26. The U is open toward the front Its lower branch 34 extends under the carrying beam 26 to the front edge 35 of the carrying beam 26, to which it is connected by a plurality of bolts 36. The upper branch 37 of the U is notably shorter than the lower branch 34 and is connected to the rear edge 38 of the carrying beam 26 by a plurality of bolts 39.

In FIG. 2, it is seen that the mowing group 17 comprises a skid 24 at the level of each rotary cutting element 27. Each skid 24 is formed by a sole 40 that exhibits the shape of a ski and that is connected at its front part to a protecting element 41. In the example illustrated, this connection is made by welding. The protecting element 41, seen from above, exhibits the shape of a sector of a circle the center of which is on the geometric axis 30 of rotation of the corresponding rotary cutting element 27 and the radius of which is slightly greater than the radius of the end trajectory described by the corresponding cutting tool support 28.

Each skid 24 thus formed is connected to the front edge 35 of the carrying beam 26 by a front connection 42 and to a vertical branch 43 of the U of the stiffening element 33 by a rear connection 44. The front connection 42, as can be seen in FIG. 4, is a connection by pinching. For this purpose, the protecting element 41 is formed by an upper piece of sheet metal 45 and a lower piece of sheet metal 46 that are welded to one another along their respective circular front edges 47, 48. A space 49 into which the front edge 35 of the carrying beam 26 fits exists at the rear between the upper piece of sheet metal 45 and the lower piece of sheet metal 46. The connection by pinching is then obtained by two bolts 50 that pinch the front edge 35 of the carrying beam 26 between the two pieces of sheet metal 45, 46 of the protecting element 41 of the skid 24.

The First Embodiment

According to a first embodiment of the invention, the rear connection 44 is made as follows. An opening 51 which, in the example illustrated, is rectangular in shape (FIG. 2) is made in the rear part of the sole 40 of the skid 24. A connection element 52 exhibiting an L shape, seen along the arrow F3 (FIG. 2), extends through the opening 51 and connects the skid 24 to the stiffening element 33. For this purpose, the connection element 52 comprises, on the one hand, a branch 53 directed upwardly and going through the opening 51 provided in the rear part of the sole 40 of the skid 24 and, on the other hand, a branch 54 directed toward the rear and extending under the sole 40 of the skid 24. The connection element 52 is connected to the stiffening element 33 by a bolt 55 that goes through the branch 53 of the connection element 52 and that is screwed in a threaded hole 56 provided for this purpose in the stiffening element 33. Thus, the connection element 52 provided in this way, on the one hand, is connected rigidly but detachably to the stiffening element 33 (i.e., to the cutting bar 23), and, on the other hand, is connected to the skid 24 by hooking in the opening 51. It is also seen in FIGS. 2 and 3 that the opening 51 has a sufficient dimension to allow the passage of the branch 54 of the connection element 52 during separation of the rear part of a broken sole 40 and of the connection element 52 as will be described below.

Mounting of a skid 24 on the cutting bar 23 is performed as follows:

(1) the skid 24 is slid on the front edge 35 of the carrying beam 26;

(2) the front edge 35 of the carrying beam 26 is pinched between the two pieces of sheet metal 45, 46 of the skid 24 with the bolts 50;

(3) the branch 53 of the connection element 52 is introduced from beneath in the opening 51 of the skid 24; and (4) the connection element 52 is screwed to the cutting bar 23 by the bolt 55.

The advantage of the rear connection 44 is seen in the following description.

During work, the cutting bar 23 slides over the ground 25 resting on the skids 24. In doing this, a zone 57 of each skid 24 is subjected to very great wear. If a skid 24 is not replaced in time, the thickness of the material can become insufficient in the zone 57 so that the sole 40 of the skid 24 can break at this spot (the rear part of a broken sole 40 has been represented in mixed lines in FIG. 3). As the mower continues to advance in the direction of the arrow 13, the front edge 58 of the rear part of the broken sole 40 can hook into the ground 25. This will then cause the immediate stopping of the rear part of the broken sole 40 and its separation from the connection element 52. This separation is possible because the opening 51 is large enough to allow the passage of the branch 54 of the connection element 52.

The Second Embodiment

Another embodiment of a rear connection 440 of a skid 240 is represented in FIG. 5. This embodiment is somewhat more costly than the preceding example, but it facilitates separation of the rear part of a broken sole 400.

In the second embodiment, a connection element 520 is similar to the preceding connection element 52 to the extent that it also exhibits the shape of an L having a branch 540 directed backwardly and a branch 530 directed upwardly.

The sole 400 of the skid 240 comprises at its rear end an inclined part 59 inclined toward the rear and upwardly. An opening 510 through which upwardly directed branch 530 passes is made in the inclined part 59. The arrangement is made so that, when the connection element 520 is connected to the cutting bar 23, a lower face 60 of the branch 540 directed toward the rear is located at least approximately at the same level as an upper face 61 of a part 62 of the sole 400 located, considering the direction of advance, directly in front of the connection element 520.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by letters patent of the United States is:

1. A mower having a direction of advance during working operation and comprising at least one mowing group provided with:
   (a) a cutting bar that comprises a carrying beam and cutting elements, at least some of said cutting elements being supported by said carrying beam, said cutting bar extending during work close to a ground to be mown; and
   (b) skids by which said cutting bar slides over said ground during work, each one of said skids being connected to said cutting bar by a front connection and a rear connection when considering said direction of advance during work, each one of said skids comprising a sole adapted during use of said mower to be in contact with said ground, said sole having a front part and a rear part when considering said direction of advance during work, said rear connection connecting said rear part of said sole to said cutting bar and comprising connecting means that allow said rear part of said sole to separate from said cutting bar, in a relative movement directed backwardly when considering said direction of advance during working operation of said mower, after separation of said rear part of said sole from said front part of said sole due to excessive wear.

2. A mower according to claim 1 wherein said connecting means comprise a connecting element:
   (a) that is rigidly connected to said cutting bar and
   (b) that is connected to said rear part of said sole of said skid by hooking in an opening in said rear part of said sole of said skid.

3. A mower according to claim 2 wherein:
   (a) said connecting element exhibits an L shape that comprises a branch directed backwardly and a branch directed upwardly;
   (b) said branch directed backwardly extends under said rear part of said sole of said skid;
   (c) said branch directed upwardly goes through said opening provided in said rear part of said sole of said skid; and
   (d) said opening has a sufficient dimension to allow the passage of said branch directed backwardly during separation of said rear part of said sole of said skid from said cutting bar.

4. A mower according to claim 3 wherein a lower face of said branch directed backwardly extends at least approximately at a same level as an upper face of a portion of said rear part of said sole of said skid extending, considering said direction of advance during work directly in front of said connecting element.

5. A mower according to claim 4 wherein said opening is made at least partially in a portion of said rear part of said sole of said skid that is inclined upwardly.

6. A mower according to claim 3 wherein said connecting element is connected to said cutting bar by said branch directed upwardly.

7. A mower according to claim 2 wherein said connecting element is detachably connected to said cutting bar.

8. A mower according to claim 1 wherein:
   (a) said carrying beam is made in the form of a housing in which drive elements of said cutting elements extend;
   (b) a stiffening element sized, shaped, and positioned to stiffen said housing is connected to said housing; and
   (c) each one of said skids is connected to said stiffening element by its rear connection.

9. A mower according to claim 1 wherein:
   (a) each one of said cutting elements extends above said carrying beam and rotates around a corresponding geometric axis directed upwardly and
   (b) at least some of said cutting elements are guided in rotation in said carrying beam.

10. A mowering group for a mower, said mowing group being adapted to be moved in a direction of advance during use of said mower, said mowing group being provided with:
    (a) a cutting bar that comprises a carrying beam and cutting elements, at least some of said cutting elements being supported by said carrying beam, said cutting bar being adapted to extend close to a ground to be mown during working operation; and
    (b) skids by which said cutting bar is adapted to slide over said ground during work, each one of said skids being connected to said cutting bar by a front connection and a rear connection when considering said direction of work advance during use of said mower, each one of said skids comprising a sole adapted during use of said mower to be in contact with said ground, said sole having a front part and a rear part when considering said direction of work during use of said mower, said rear connection connecting said rear parts of said sole to said cutting bar and comprising connecting means that allow said rear part of said sole to separate from said cutting bar, in a relative movement directed backwardly when considering said direction of advance during use of said mower, after separation of said rear part of said sole from said front part of said sole due to excessive wear.

11. A mowing group according to claim 10 wherein said connecting means comprise a connecting element:
    (a) that is rigidly connected to said cutting bar and
    (b) that is connected to said rear part of said sole of said skid by hooking in an opening in said rear part of said sole of said skid.

12. A mowing group according to claim 11 wherein:
    (a) said connecting element exhibits an L shape that comprises a branch directed backwardly and a branch directed upwardly;
    (b) said branch directed backwardly extends under said rear part of said sole of said skid;
    (c) said branch directed upwardly goes through said opening provided in said rear part of said sole of said skid; and
    (d) said opening has a sufficient dimension to allow the passage of said branch directed backwardly during separation of said rear part of said sole of said skid from said cutting bar.

13. A mowing group according to claim 12 wherein a lower face of said branch directed backwardly extends at least approximately at a same level as an upper face of a portion of said rear part of said sole of said skid extending, considering said direction of work during use of said mower, directly in front of said connecting element.

14. A mowing group according to claim 13 wherein said opening is made at least partially in a portion of said rear part of said sole of said skid that is inclined upwardly.

15. A mowing group according to claim 12 wherein said connecting element is connected to said cutting bar by said branch directed upwardly.

16. A mowing group according to claim 11 wherein said connecting element is detachably connected to said cutting bar.

17. A mowing group according to claim 10 wherein:

(a) said carrying beam is made in the form of a housing in which drive elements of said cutting elements extend;
(b) a stiffening element sized, shaped, and positioned to stiffen said housing is connected to said housing; and
(c) each one of said skids is connected to said stiffening element by its rear connection.

18. A mowing group according to claim 10 wherein:
(a) each one of said cutting elements extends above said carrying beam and rotates around a corresponding geometric axis directed upwardly and
(b) at least some of said cutting elements are guided in rotation in said carrying beam.

* * * * *